US010118231B2

(12) United States Patent
Bookheimer et al.

(10) Patent No.: US 10,118,231 B2
(45) Date of Patent: Nov. 6, 2018

(54) CAM BOLTS AND TOOL COUPLING SYSTEMS EMPLOYING THE SAME

(71) Applicant: Kennametal Inc., Latrobe, PA (US)

(72) Inventors: Alan Joseph Bookheimer, Greensburg, PA (US); Jeanne Marie McCullough, Derry, PA (US); Ruy Frota De Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 547 days.

(21) Appl. No.: 14/591,464

(22) Filed: Jan. 7, 2015

(65) Prior Publication Data

US 2016/0195119 A1 Jul. 7, 2016

(51) Int. Cl.
*B23B 31/107* (2006.01)
*F16B 19/02* (2006.01)
*F16B 7/04* (2006.01)
*F16B 21/16* (2006.01)

(52) U.S. Cl.
CPC .......... *B23B 31/1071* (2013.01); *F16B 19/02* (2013.01); *B23B 2231/40* (2013.01); *B23B 2260/02* (2013.01); *F16B 7/0413* (2013.01); *F16B 21/165* (2013.01); *Y10T 279/1045* (2015.01); *Y10T 279/17846* (2015.01); *Y10T 409/309464* (2015.01)

(58) Field of Classification Search
CPC .......... F16B 19/02; F16B 21/165; F16B 7/04; F16B 7/0413; B23B 29/04; B23B 29/046; B23B 31/26; B23B 31/261; B23B 31/1071; B23B 2231/40; B23B 2260/02; B23B 2260/034; Y10T 279/17846; Y10T 279/17923; Y10T 279/1037; Y10T 279/1041; Y10T 279/1045; Y10T 279/1091; Y10T 409/309464
See application file for complete search history.

(56) References Cited

U.S. PATENT DOCUMENTS

| 4,615,244 A | 10/1986 | Reiter et al. |
| 4,715,753 A | 12/1987 | Tack |
| 4,736,659 A | 4/1988 | Erickson |
(Continued)

FOREIGN PATENT DOCUMENTS

| JP | 2008110456 A | 5/2008 | |
| WO | WO 2016058899 A1 * | 4/2016 | ......... B23B 31/1075 |

*Primary Examiner* — Eric A Gates
*Assistant Examiner* — Chwen-Wei Su
(74) *Attorney, Agent, or Firm* — Matthew S. Bedsole

(57) ABSTRACT

In one aspect, cam bolts are described herein employing a dual cam surface architecture. In some embodiments, a cam bolt described herein defines a longitudinal axis and comprises a first end, a second end, at least one engagement member disposed on at least one of the first end and the second end, at least two first cam surfaces, and at least one second cam surface. The engagement member is configured to engage a torque implement to rotate the cam bolt about the longitudinal axis when torque is applied by the torque implement. The first cam surfaces are disposed about the longitudinal axis and have a first cam profile. The second cam surface is disposed about the longitudinal axis between the first cam surfaces and has a second cam profile differing from the first cam profile. At least one of the first and second cam profiles can be non-circular.

8 Claims, 15 Drawing Sheets

(56) References Cited

U.S. PATENT DOCUMENTS

| | | | |
|---|---|---|---|
| 5,346,344 A | 9/1994 | Kress et al. | |
| 5,415,066 A | 5/1995 | Erickson et al. | |
| 5,452,631 A * | 9/1995 | Erickson | B23B 29/046 |
| | | | 409/234 |
| 5,466,102 A | 11/1995 | Erickson | |
| 5,851,091 A | 12/1998 | Klement | |
| 8,601,918 B2 * | 12/2013 | Erickson | B23B 29/046 |
| | | | 82/158 |
| 9,669,470 B2 * | 6/2017 | Matlik | B23B 31/265 |
| 2006/0140736 A1 | 6/2006 | Kress et al. | |
| 2011/0067536 A1 | 3/2011 | Erickson | |
| 2016/0052063 A1 * | 2/2016 | Englund | B23B 31/265 |
| | | | 279/2.1 |
| 2016/0052065 A1 * | 2/2016 | Englund | B23B 31/4006 |
| | | | 279/2.02 |

* cited by examiner

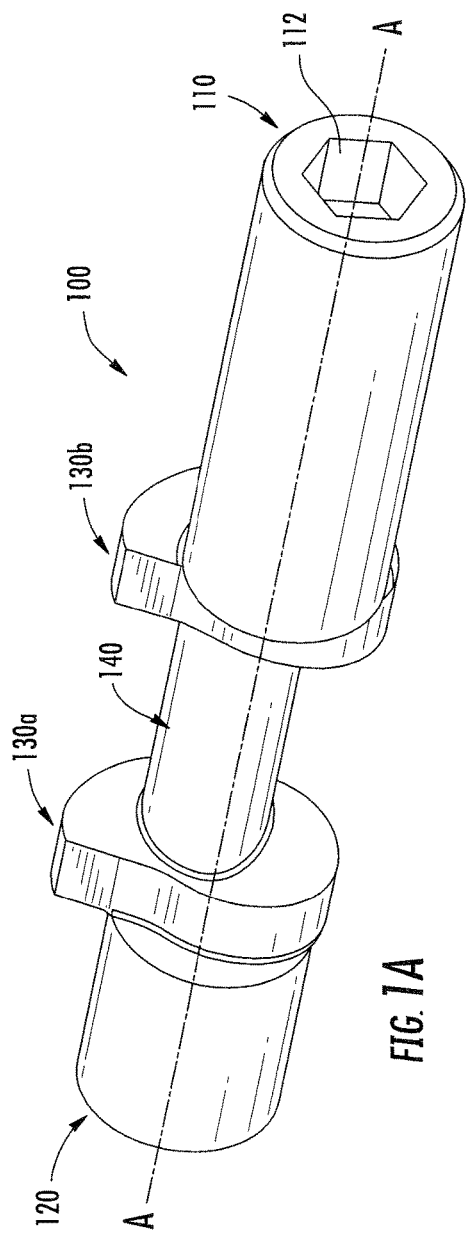
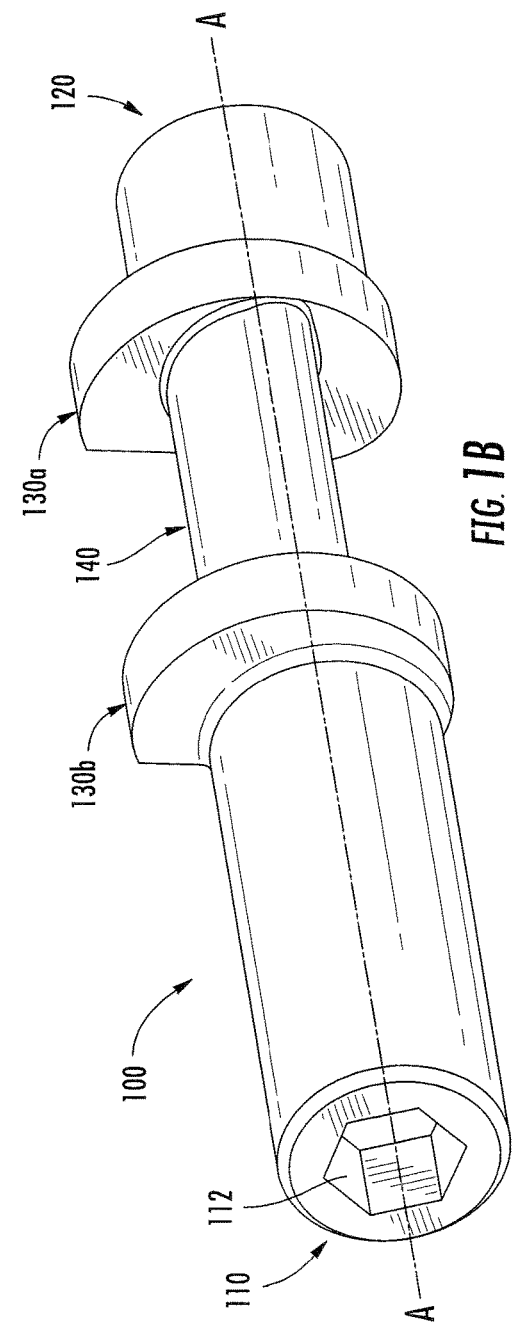
FIG. 1A
FIG. 1B

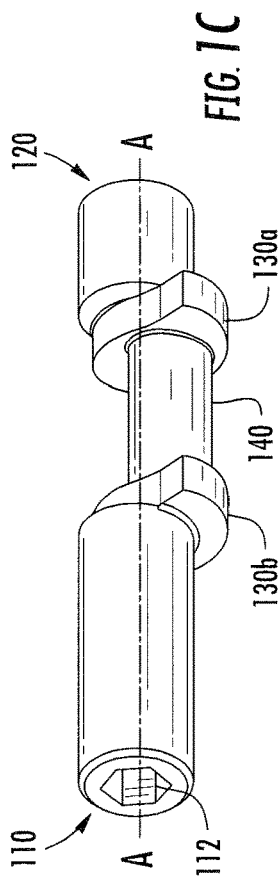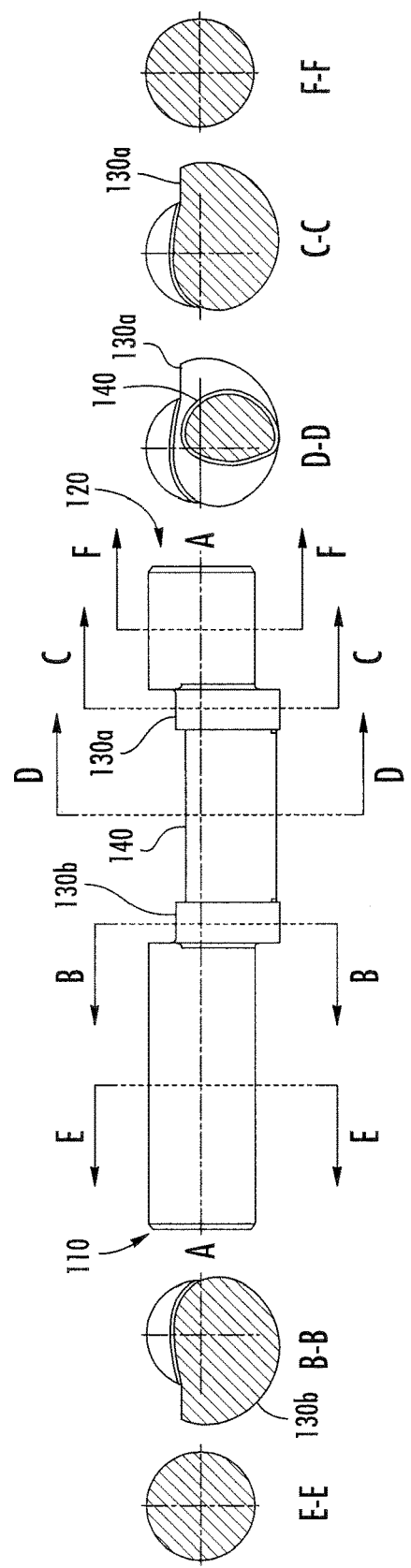
FIG. 1C
FIG. 1D

CAM BOLTS AND TOOL COUPLING SYSTEMS EMPLOYING THE SAME

FIELD

The present invention relates to cam bolts and, in particular, to tool coupling systems employing cam bolts.

BACKGROUND

Tool coupling systems and spindle connector assemblies configured for use with interchangeable cutting or machining tools provide a number of process efficiencies. A smaller number of machine spindles can be used for a larger variety of machine operations, and downtime between various cutting tasks can be reduced by decreased need to switch apparatus for each machining application. In order to realize the foregoing efficiencies, tool coupling systems and spindle connector assemblies must be capable of secure connection with minimal tool change downtime and reduced operator effort to secure the tool head.

One approach to securing a tool in a tool coupling system and/or spindle connector assembly utilizes rotation of a cam bolt to actuate a drawbar. Conventional cam bolts and associated systems require large amounts of locking and unlocking torque, particularly in coupling systems for large tools or in systems designed to impart high locking forces. Such disadvantages can require specialized torque implements, increase tool change downtime or increase the risk of injury to a machine operator. Therefore, there exists a need for improved methods and apparatus for locking and unlocking a tool coupling system and/or a spindle connector assembly.

SUMMARY

In one aspect, cam bolts are described herein employing a dual cam surface architecture. For example, a cam bolt described herein defines a longitudinal axis and comprises a first end, a second end and at least one engagement member disposed on the first end or the second end. The engagement member is configured to engage a torque implement to rotate the cam bolt about the longitudinal axis when torque is applied by the torque implement. The cam bolt also comprises two or more first cam surfaces and at least one second cam surface. The first cam surfaces are disposed about the longitudinal axis and have a first cam profile. The second cam surface is disposed about the longitudinal axis between the first cam surfaces and has a second cam profile differing from the first cam profile. At least one of the first cam surface and the second cam surface is configured to engage at least one of a drawbar and a follower in a clamping and/or unclamping operation.

In another aspect, a tool coupling system is described herein. The tool coupling system defines a central longitudinal axis and comprises a drawbar, at least one spring-like element, at least one follower and a cam bolt. The drawbar is arranged substantially parallel to the central longitudinal axis and is movable between a locked position and an unlocked position. The follower is configured to engage the at least one spring-like element. Moreover, the cam bolt is rotatable about a transverse axis substantially normal to the central longitudinal axis. The cam bolt includes at least one first cam surface having a first cam profile and at least one second cam surface having a second cam profile differing from the first cam profile. The rotating cam bolt moves the drawbar between the locked position and the unlocked position.

In a further aspect, methods of locking and unlocking a spindle connector assembly are described herein. For example, a method comprises providing a spindle connector assembly having a drawbar movable between a locked position and an unlocked position, a spring-like element and a follower engaging the spring-like element and the drawbar. The spindle connector assembly also comprises a cam bolt rotatable about an axis. The cam bolt comprises an engagement member, at least one first cam surface having a convex portion and at least one second cam surface having a convex portion differing from the first cam surface. A torque implement is coupled with the engagement member of the cam bolt and rotated in a first direction to engage the convex portion of the first cam surface with the follower, moving the drawbar into the locked position. The torque implement is rotated in a second direction opposite the first direction to disengage the convex portion of the first cam surface and to engage the drawbar with the convex portion of the second cam surface, thereby moving the drawbar into the unlocked position.

BRIEF DESCRIPTION OF THE DRAWINGS

FIGS. 1A-1C illustrate perspective views of a cam bolt according to one embodiment described herein.

FIG. 1D illustrates an elevation view and various cross-sectional views taken from the elevation view of the cam bolt of FIG. 1A.

DETAILED DESCRIPTION

Figure 2A:
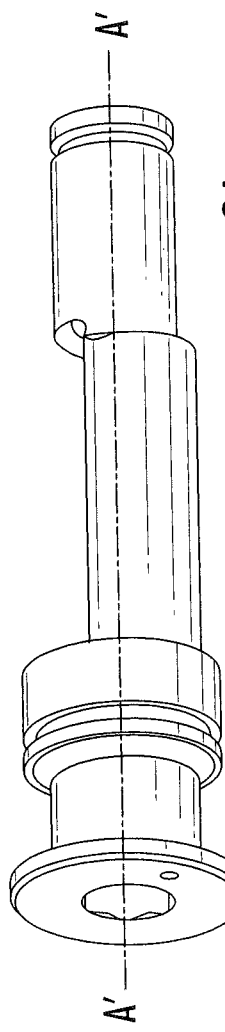
FIG. 2A illustrates a perspective view of a conventional cam bolt.

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

I. Cam Bolts

Referring now to FIGS. 1A-1D, there is illustrated a cam bolt, generally designated as reference number 100, in accordance with one embodiment described herein. As provided in FIGS. 1A-1D, the cam bolt defines a longitudinal axis (A-A) and comprises a first end (110), a second end (120), at least one engagement member (112) disposed on at least one of the first end (110) and the second end (120), at least two first cam surfaces (130a, 130b) and at least one second cam surface (140). The engagement member (112) is configured to engage a torque implement (not shown) to rotate the cam bolt (100) about the longitudinal axis (A-A). First cam surfaces (130a, 130b) are disposed about the longitudinal axis (A-A) and have a first cam profile. The second cam surface (140) is disposed about the longitudinal axis (A-A) between the first cam surfaces (130a, 130b) and has a second cam profile differing from the first cam profile.

In some embodiments, cam bolts described herein are monolithic. A monolithic structure generally inhibits or prevents movement of one or more components, elements, or surfaces relative to one another. Cam bolts can have any shape or configuration not inconsistent with the objectives of the present invention. For example, an engagement member (112) of a cam bolt can be disposed on one or both of the first end (110) and the second end (120) of the cam bolt (100). Further, an engagement member (112) can have any shape, architecture, or configuration operable to engage a torque implement to rotate the cam bolt (100) about the longitudinal axis (A-A) when torque is applied by the torque implement. A "torque implement," for reference purposes herein, is any apparatus, tool, or device operable to impart rotational force. For example, a torque implement can be a screwdriver, wrench, hex key, ratchet, or torque multiplier. An engagement member (112), therefore, can have any architecture including a recess and/or a protrusion in which or upon which a rotational force can be applied by such torque implements. In some embodiments, as illustrated in FIGS. 1A-1C, an engagement member (112) comprises a hex socket. In other cases, an engagement member (112) can be a recess having any shape configured to engage a torque implement, such as a Phillips, POZIDRIV®, square, Robertson, security hex, TORX®, tri-wing, TORQ-SET®, spanner head, clutch, double-square, triple square, polydrive, spline drive, double hex, Bristol, or pentalobular head. In certain embodiments, an engagement member (112) is a protrusion or raised surface configured to engage a complementary or similarly shaped recess in a torque implement. Such a protrusion can correspond to any one or more of the foregoing list of recessed engagement shapes.

Cam bolts (100) comprise first cam surfaces (130a, 130b) disposed about the longitudinal axis (A-A). In some embodiments, cam bolts (100) described herein comprise one first cam surface (130a). In certain other cases, cam bolts (100) comprise at least two first cam surfaces (130a, 130b) as illustrated in FIGS. 1A-1D. First cam surfaces (130a, 130b) have a first cam profile. The first cam profile can be non-circular. For example, as illustrated in FIG. 1D, the first cam surfaces (130a, 130b) have a first cam profile comprising a convex portion having a first radius of curvature. In certain other embodiments, a first cam profile comprises a convex portion having a first radius of curvature and a concave portion. In some cases, a first cam profile can have a cross-sectional shape defined by a curved outer surface having a continually increasing radius along at least one portion thereof, such as along at least half of the outer surface. First cam surfaces (130a, 130b) having a first cam profile generally have the same or substantially the same shape, size, orientation, location and/or position as illustrated in FIGS. 1A-1D. Such structure permits even contact and/or force distribution along the perimeter and/or convex portion of the first cam surfaces (130a, 130b) when engaging in a spindle coupling or spindle locking operation as described further herein below. In some cases, first cam profiles are eccentric relative to the longitudinal axis (A-A). When used in the context of a non-circular or non-cylindrical cam or cam surface, "eccentric", for reference purposes herein, indicates that an axis of rotation (generally parallel to or collinear with the longitudinal axis (A-A)) is offset from a centermost point of the cam or cam surface. FIG. 1D illustrates an embodiment of first cam profiles of first cam surfaces (130a, 130b) eccentric relative to the longitudinal axis (A-A).

Cam bolts (100) further comprise at least one second cam surface (140) disposed about the longitudinal axis (A-A). A second cam surface (140) has a second cam profile which differs from the first cam profile, as illustrated in the embodiment of FIG. 1D. In some cases, the first cam profile and the second cam profile differ in at least one of size, shape orientation, location and/or position. A second cam profile can have any architecture or configuration not inconsistent with the objectives of the present invention. For example, the second cam profile can be non-circular. Further, the second cam profile can be eccentric relative to the longitudinal axis (A-A) as illustrated in FIG. 1D. In some cases, the second cam profile can have a cross-sectional shape defined by a curved outer surface having a continually increasing radius along at least one portion thereof, such as along at least half of the outer surface. In certain embodiments, the second cam surface (140) comprises a convex portion having a second radius of curvature and a concave portion. The second radius of curvature can be smaller than the first radius of curvature.

In some cases, at least a portion of the second cam profile can be flush with at least a portion of a first cam profile. "Flush," for reference purposes herein, indicates that two surfaces are level or substantially even with one another. In such embodiments, a planar surface contacting the flush portion of the first cam surfaces (130a, 130b) may also contact a corresponding portion of the second cam surface (140). Further, a convex portion of a second cam profile can be oriented such that part of the convex portion of the second cam profile is flush with part of the convex portion of the first cam profile while maintaining differing orientations relative to one another. For example, an apex or outermost point of the convex portion of the second cam profile can be rotated about 90° relative to the apex or outermost point of the convex portion of the first cam profile. Cam bolts (100) utilizing cam surfaces in this or a similar configuration can permit transition of locking and unlocking torque between first cam surfaces (130a, 130b) and a second cam surface (140) as described further herein below.

Second cam surfaces (140) can be arranged or positioned in any manner consistent with the objectives of the present invention. For example, in some cases, the second cam surface (140) is adjacent to at least one of the first cam surfaces (130a, 130b). In such a configuration, the second cam surface (140) is positioned next to a first cam surface (130a, 130b) in an axial direction along the longitudinal axis (A-A) without intervening structure or spacing therebetween. In certain cases, the second cam surface (140) is disposed between first cam surfaces (130a, 130b) as illustrated in FIGS. 1A-1D. In such embodiments, the second cam surface (140) can be said to space apart the first cam surfaces (130a, 130b) along the longitudinal axis (A-A).

Figure 2B:
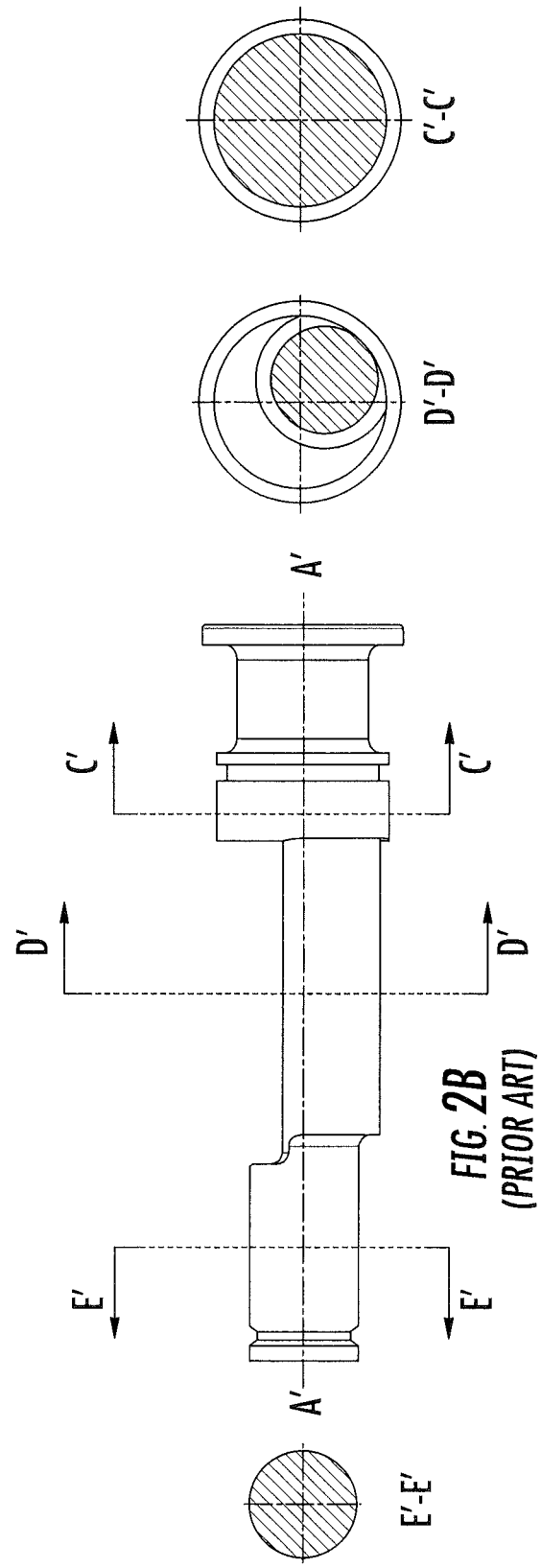
FIG. 2B illustrates an elevation view and various cross-sectional views taken from the elevation view of the conventional cam bolt of FIG. 2A.

Embodiments of a cam bolt comprising at least one first cam surface (130a, 130b) and a second cam surface (140) can be said to have a "dual cam" design or architecture. Such designs stand in contrast to a conventional "single cam" design or architecture. FIGS. 2A and 2B illustrate one such conventional single cam design. Embodiments of dual cam designs described herein can reduce torque associated with a locking, clamping, or coupling action in a tool coupling system such as a spindle connector assembly in addition to reduction of torque associated with unlocking, unclamping, or decoupling action in such systems. In some cases, one or more of the first and second cam surfaces can be configured or adapted to provide such function when rotated over a predetermined range of angles or arc, such as greater than 180°. Further description of tool coupling systems incorporating a dual cam architecture, methods of locking and unlocking a spindle connector assembly, and comparison of certain embodiments of the present invention and conventional single cam designs are provided herein below.

II. Tool Coupling Systems

Figure 3A:
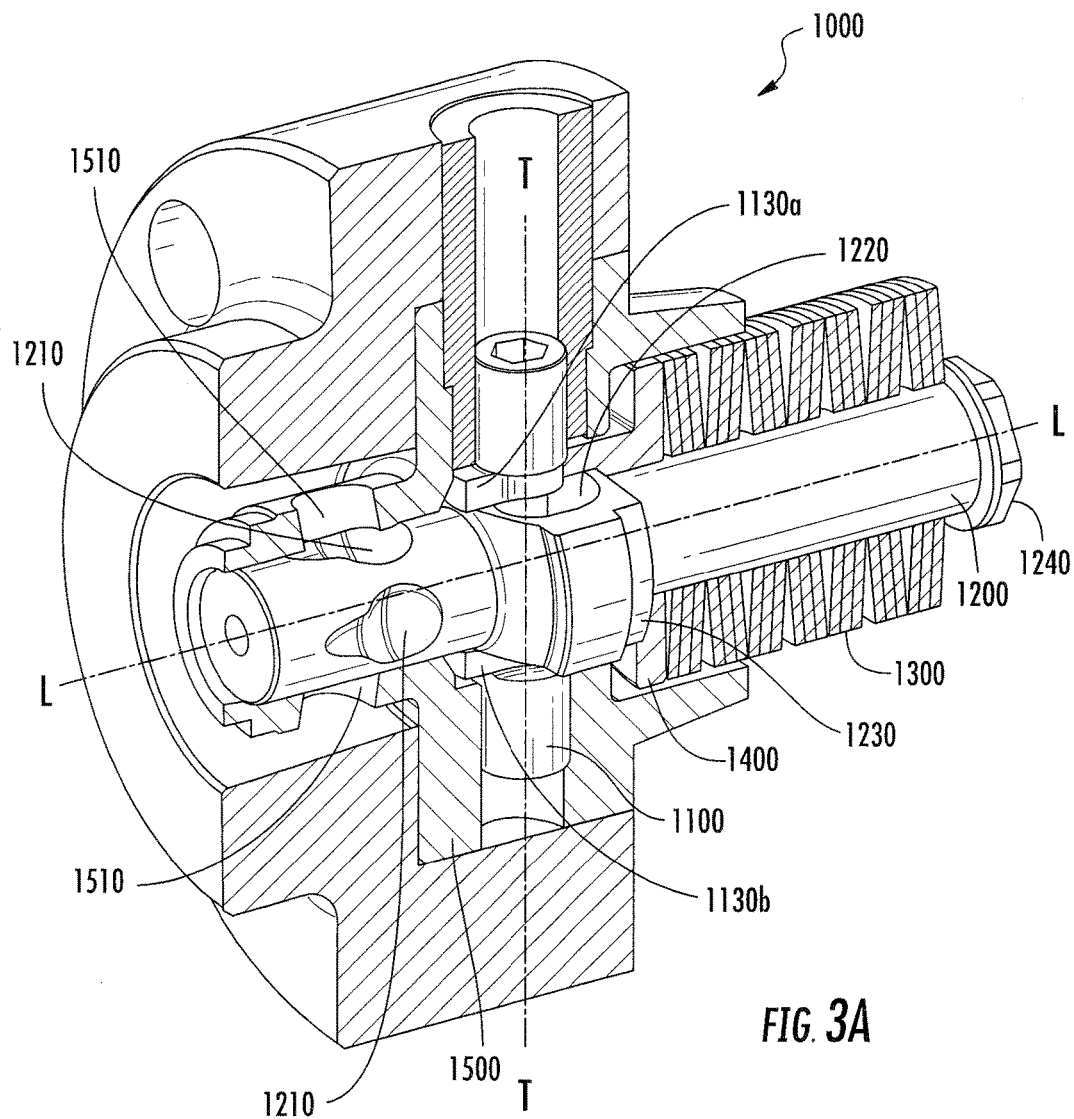
FIG. 3A illustrates a composite view including cross-sectional views and perspective views of a tool coupling system according to one embodiment described herein.
Figure 3B:
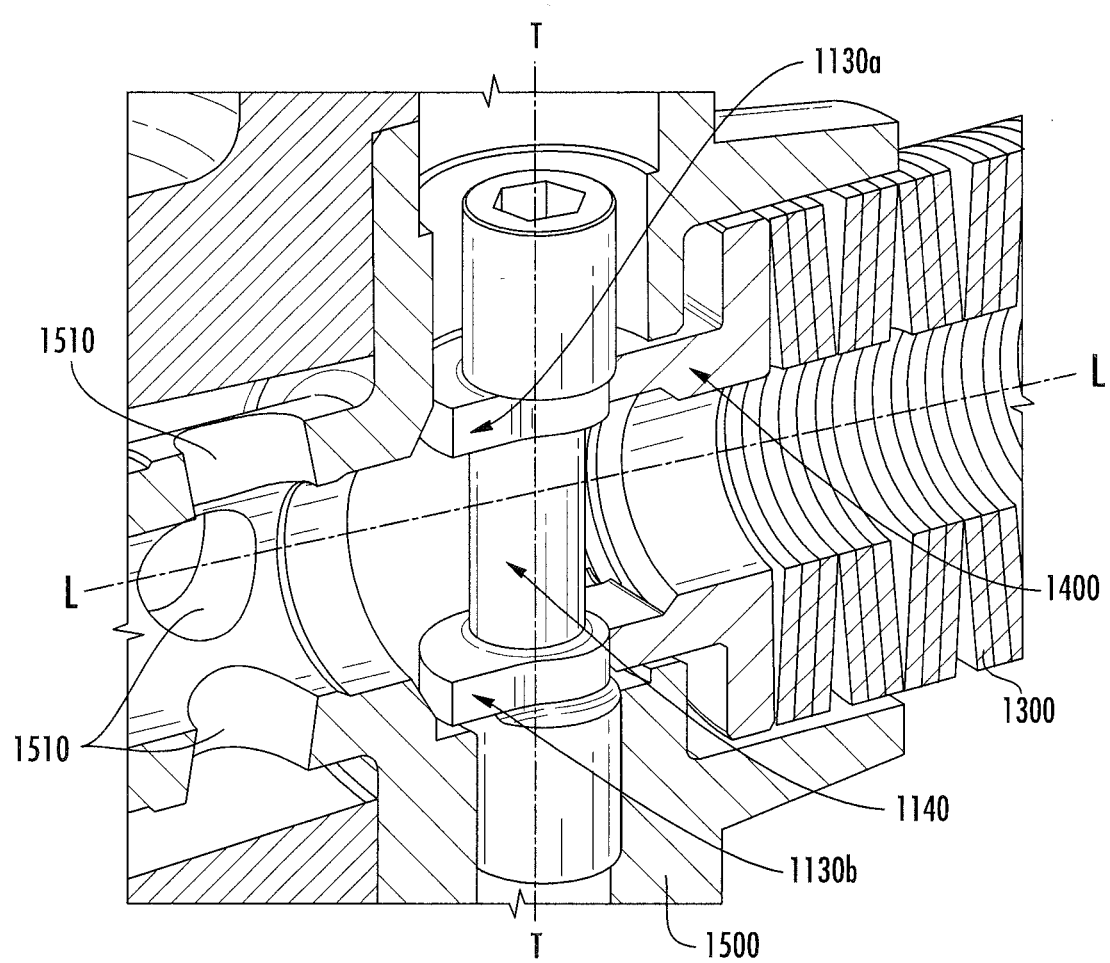
FIG. 3B illustrates a sectional composite view including cross-sectional views and perspective views of a portion of the tool coupling system of FIG. 3A.

In another aspect, tool coupling systems are described herein. Referring now to FIGS. 3A and 3B, there is illustrated a tool coupling system, such as a spindle connector assembly, generally designated 1000, in accordance with one embodiment described herein. A tool coupling system (1000) described herein defines a central longitudinal axis (L-L) and comprises a drawbar (1200), at least one spring-like element (1300), at least one follower (1400) and a cam bolt (1100). The drawbar (1200) is arranged substantially parallel to the central longitudinal axis (L-L) and is movable between a locked position and an unlocked position. The follower (1400) is configured to engage the spring-like element or elements (1300). The cam bolt (1100) is rotatable about a transverse axis (T-T) substantially normal to the central longitudinal axis (L-L) and has first cam surfaces (1130a, 1130b) having a first cam profile and at least one second cam surface (1140) having a second cam profile differing from the first cam profile. Rotating the cam bolt (1100) moves the drawbar (1200) between the locked position and the unlocked position. A cam bolt can be configured or adapted to provide such locking and unlocking function over a predetermined range of angles or arc, such as greater than 180°.

A drawbar (1200) used in a tool coupling system (1000) described herein can have any configuration or architecture not inconsistent with the objectives of the present invention. A drawbar (1200) is generally movable between a locked position and an unlocked position. For example, a drawbar (1200) can be configured to operate as a drawbar or a lockrod to apply axial force substantially parallel to the central longitudinal axis (L-L). Drawbars can be configured to actuate mechanisms to engage or retain shanks or interfaces consistent with HSK shanks (ISO 12164), PSC interfaces (ISO 26623), TS systems (ISO 26622) and/or 7/27 taper systems. The drawbar (1200) can further comprise or include at least one through-hole substantially parallel with a transverse axis (T-T) configured to receive and/or engage the cam bolt (1100). In some embodiments, the drawbar (1200) also includes one or more protrusions (1230) for engaging a follower (1400). The drawbar (1200) can further comprise an end cap or end plate (1240) configured to engage a spring-like element (1300).

Tool coupling systems (1000) further comprise at least one spring-like element (1300). Virtually any spring-like element (1300) can be used in a tool coupling system described herein. For example, as illustrated in FIGS. 3A and 3B, a spring-like element (1300) can comprise a plurality of disc springs configured to apply a force in an axial direction substantially parallel to the central longitudinal axis (L-L). Other configurations are also contemplated, for example one or more coil springs, gas springs, or other structures operable to apply an elastic or spring force. A spring-like element (1300) can bias or apply force to a drawbar (1200) into the locked position or the unlocked position. In order to apply spring force, the spring-like element (1300) can engage a follower (1400) and/or an end cap or end plate (1240).

At least one follower (1400) is configured to engage the spring-like element (1300). A follower (1400) can have any architecture or configuration. For example, as illustrated in FIGS. 3A and 3B, a follower (1400) can surround part or all of the circumference of the drawbar (1200). A follower (1400), therefore, can have a circular or semi-circular cross-sectional shape. In other embodiments, a follower (1400) can be one or more studs disposed about the central longitudinal axis while engaging the spring-like element (1300). A follower (1400) generally serves to adapt and direct force applied to spring-like element (1400). As illustrated in FIG. 3A, a follower (1400) can engage one or more protrusions (1230) on a drawbar (1200) such that the drawbar (1200) is held or biased in either a locked or unlocked position. A follower (1400) can additionally be configured to engage a cam bolt (1100). In another embodiment, systems can further comprise or include an intermediate follower (not shown) configured to engage a cam bolt and a drawbar. For example, in FIGS. 3A and 3B, the drawbar (1200) includes a recess (1220) which may be configured to have disposed therein an intermediate follower which is configured to adapt and direct force applied to the drawbar (1200) by the second cam surface (1140).

A cam bolt as described in Section I herein can be employed in the tool coupling system (1000). For example, the cam bolt (1100) is rotatable about a transverse axis (T-T) substantially normal to the central longitudinal axis (L-L), and has first cam surfaces (1130a, 1130b) having a first cam profile and at least one second cam surface (1140) having a second cam profile differing from the first cam profile. In some embodiments, the first cam profile and the second cam profile differ in at least one of size, shape, orientation, location and/or position. The first cam profile and/or the second cam profile can be arranged or disposed eccentric relative to the transverse axis (T-T). In some cases, the first cam and/or second cam profile has a cross-sectional shape defined by a curved outer surface of continually increasing radius along at least a portion thereof, such as along at least half of the outer surface. As illustrated in FIGS. 3A and 3B, first cam surfaces (1130a, 1130b) can permit the cam bolt (1100) to engage a follower (1400) separately from engagement with a drawbar (1200). In such embodiments, the second cam surface (1140) can be disposed between the first cam surfaces (1130a, 1130b). Cam bolts (1100) having a second cam surface (1140) between two first cam surfaces (1130a, 1130b) can pass through or engage a recess (1220) in a drawbar (1200) such that the second cam surface (1140) can contact or engage the drawbar (1200) while the first cam surfaces (1130a, 1130b) contact or engage the follower (1400). Further, first and/or second cam profiles can be non-circular. Configurations utilizing this architecture are operable to distribute locking torque along first cam surfaces (1130a, 1130b) and unlocking torque along a second cam surface (1140) as described further herein below.

III. Methods of Locking and Unlocking a Spindle Connector Assembly

In a further aspect, methods of locking and unlocking a spindle connector assembly are described herein. As illustrated in FIGS. 3A-7D, a spindle connector assembly (1000) comprises a drawbar (1200) movable between a locked position and an unlocked position, a spring-like element (1300), a follower (1400) engaging the spring-like element (1300) and drawbar (1200) and a cam bolt (1100) rotatable about an axis (T-T in FIGS. 3A and 3B). The cam bolt (1100) includes an engagement member (112 of FIG. 1), first cam surfaces (130a, 130b of FIG. 1) each having a convex portion and at least one second cam surface (140 of FIG. 1) having a convex portion differing from the first cam surfaces (130a, 130b of FIG. 1).

Figure 4A:
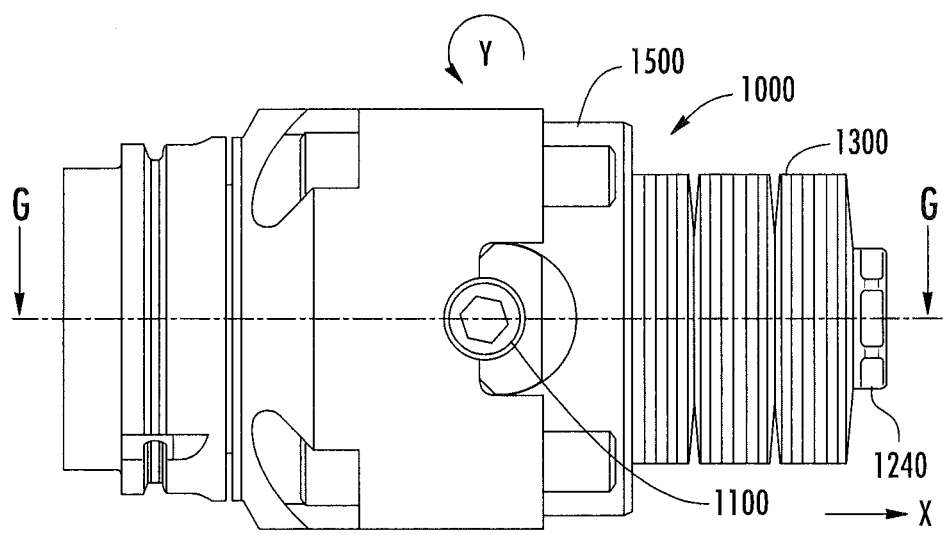
FIG. 4A illustrates an elevational view of a tool coupling system according to one embodiment described herein.
Figure 4B:
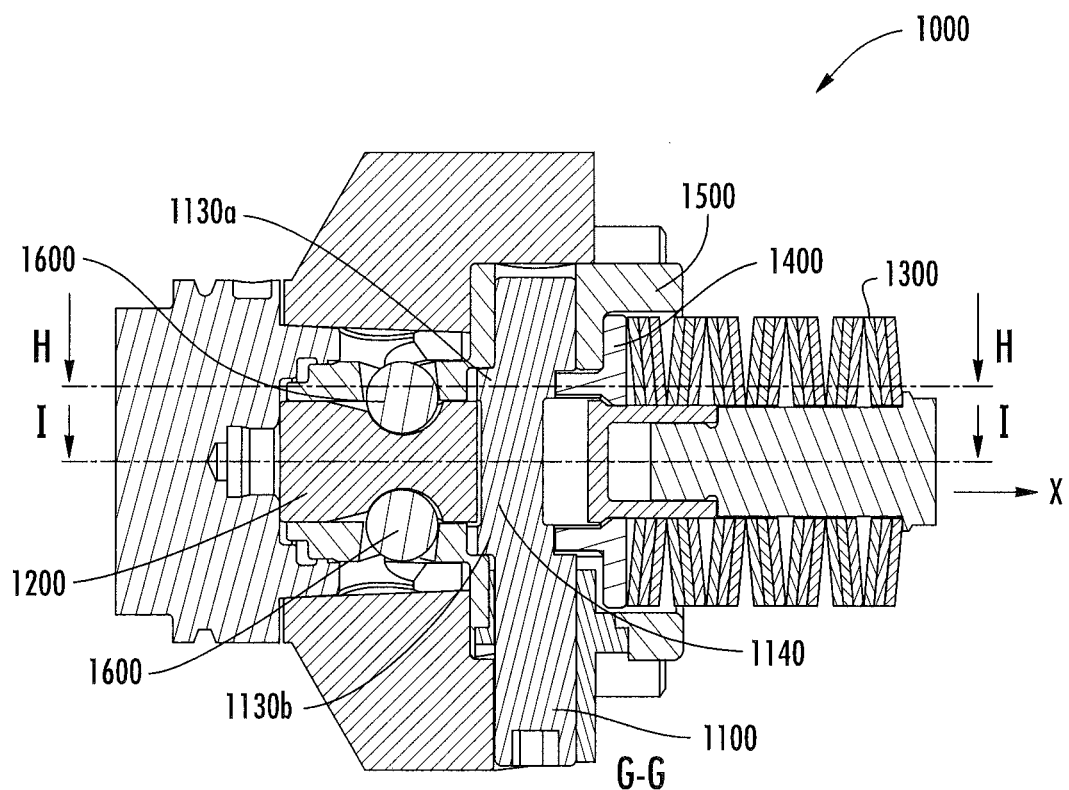
FIG. 4B illustrates a cross-sectional view of the tool coupling system of FIG. 4A taken along line G-G.
Figure 4C:
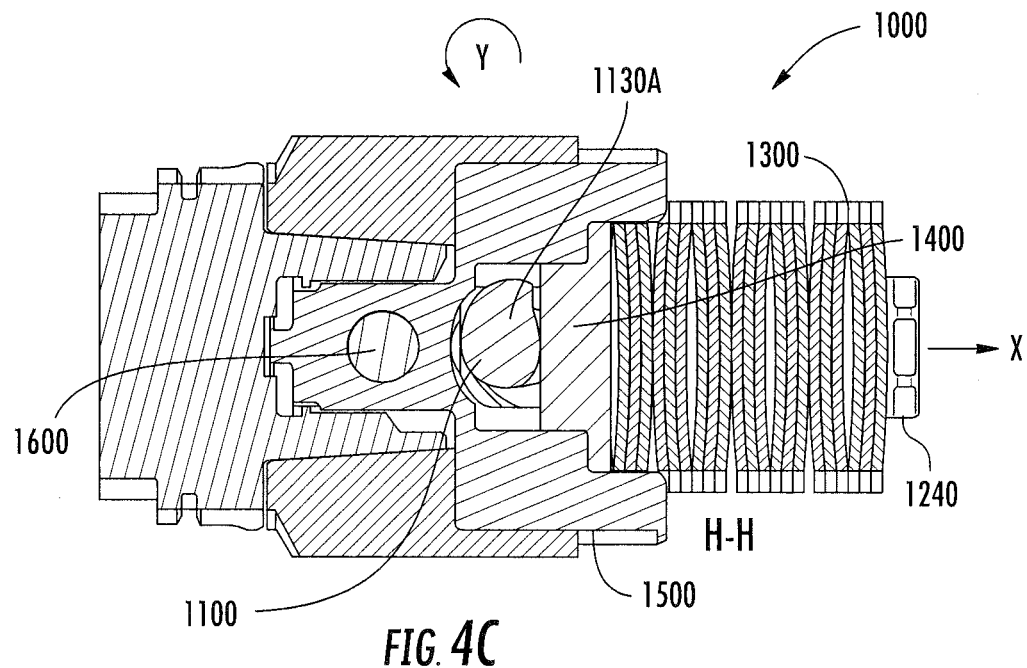
FIG. 4C illustrates a cross-sectional view of the tool coupling system of FIG. 4B taken along line H-H.
Figure 4D:
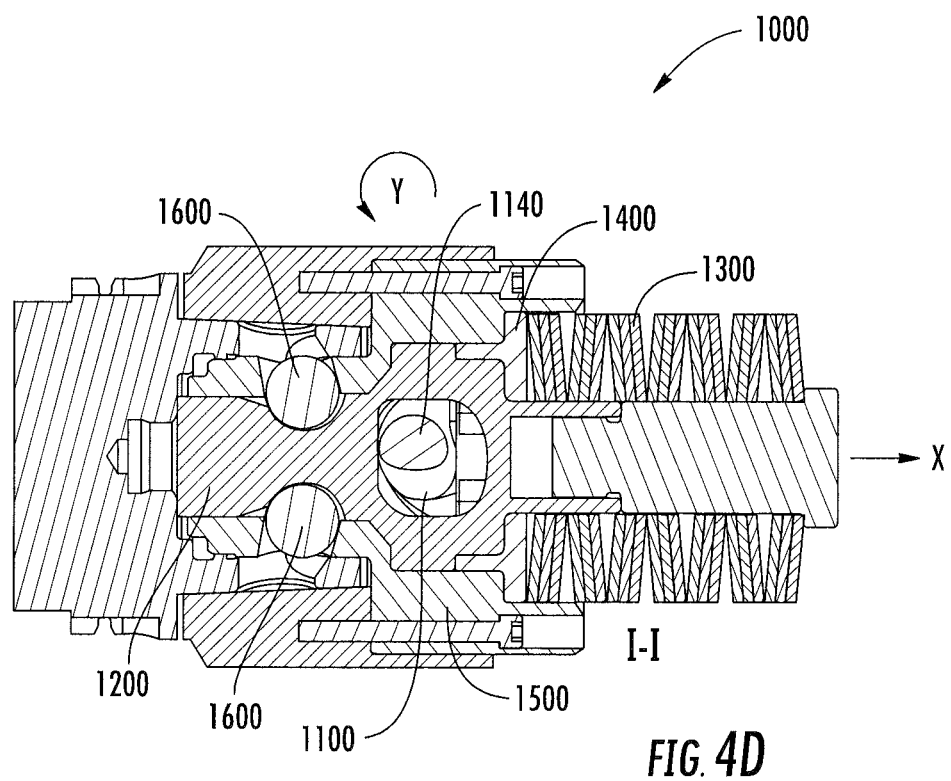
FIG. 4D illustrates a cross-sectional view of the tool coupling system of FIG. 4B taken along line I-I.
Figure 7A:
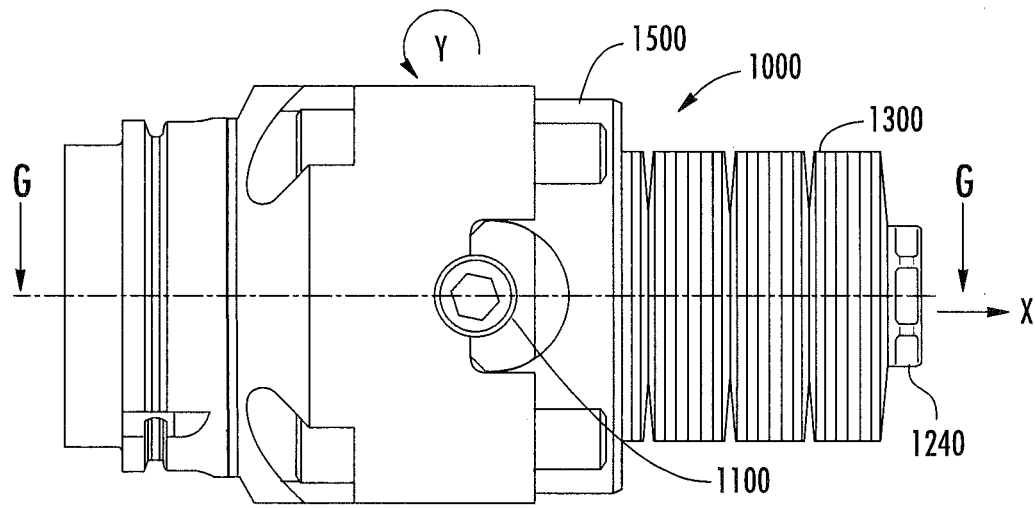
FIG. 7A illustrates an elevational view of a tool coupling system according to one embodiment described herein.
Figure 7B:
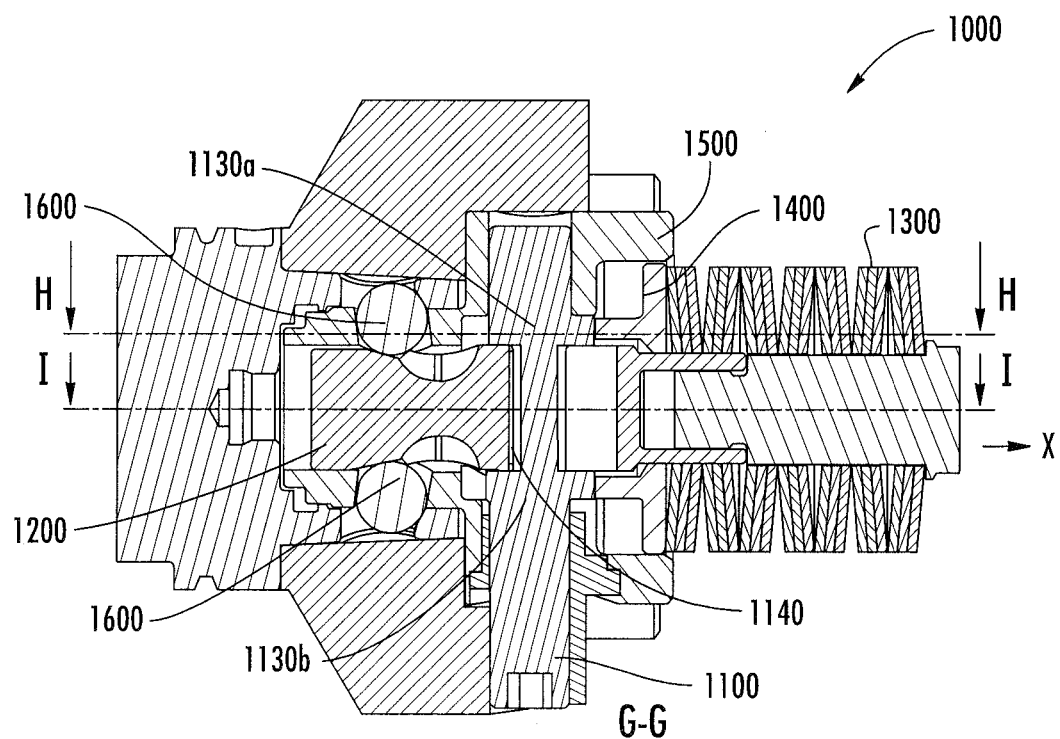
FIG. 7B illustrates a cross-sectional view of the tool coupling system of FIG. 7A taken along line G-G.
Figure 7C:
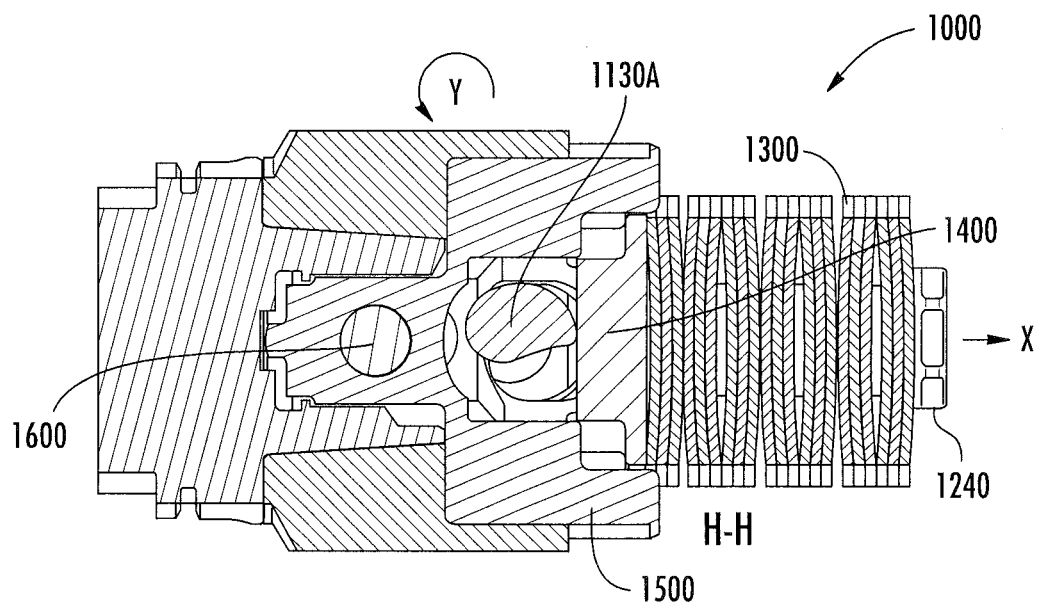
FIG. 7C illustrates a cross-sectional view of the tool coupling system of FIG. 7B taken along line H-H.
Figure 7D:
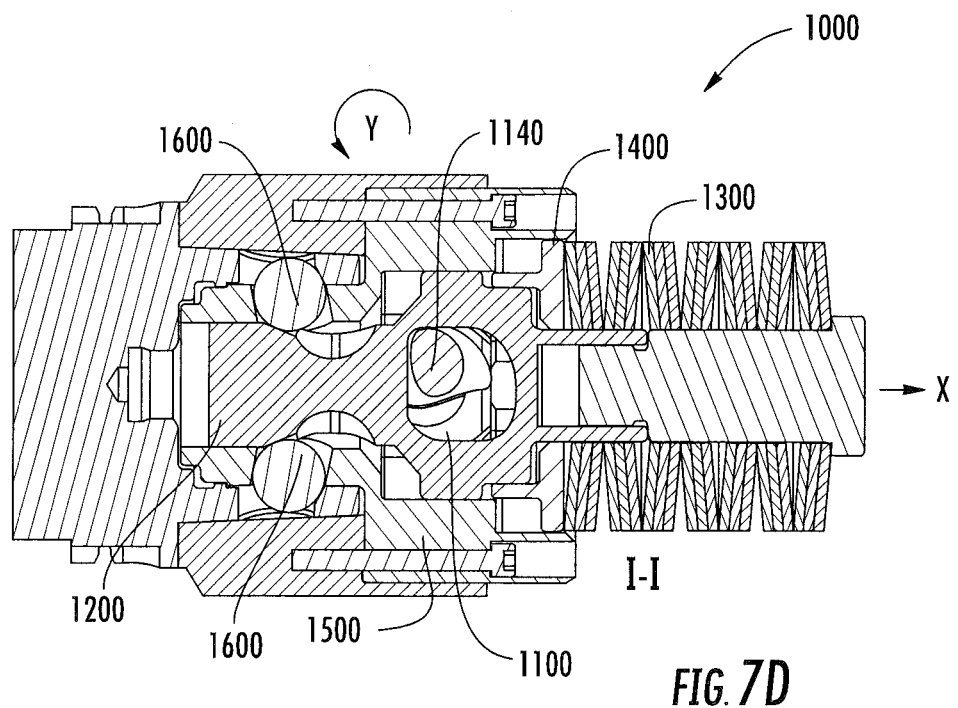
FIG. 7D illustrates a cross-sectional view of the tool coupling system of FIG. 7B taken along line I-I.

A torque implement couples the engagement member of the cam bolt (1100) and is rotated in a first direction to engage one or more portions of the cam bolt (1100) with other elements of the spindle connector assembly (1000). FIGS. 4A-7D illustrate various elevation and cross-sectional views of one embodiment of a method described herein. FIGS. 4A, 5A, 6A, and 7A are elevation views of a spindle connector assembly consistent with the description provided in Section II above. Corresponding views of FIGS. 4-7 illustrate steps of rotating a torque implement in a first direction to engage the convex portion of the first cam surfaces (1130a, 1130b) with the follower (1400) to move the drawbar (1200) into the locked position. For example, FIG. 4D illustrates a spindle connector assembly (1000) in an unlocked position, and FIG. 7D illustrates the assembly (1000) in a locked position. FIGS. 4B, 5B, 6B, and 7B are cross-sectional views of the spindle connector assembly (1000) taken along line G-G of FIGS. 4A, 5A, 6A, and 7A, respectively. FIGS. 4C, 5C, 6C, and 7C are cross-sectional views taken along line H-H, and FIGS. 4D, 5D, 6D, and 7D are cross-sectional views taken along line I-I. In FIGS. 4A-7D, arrow X illustrates the direction of axial displacement of the drawbar (1200), and arrow Y illustrates the direction of rotation of the cam bolt (1100).

In FIGS. 4A-7D, the cam bolt (1100) is rotated in a first direction. FIG. 4C illustrates a cross-sectional view of a first cam surface (1130a) in a starting or unlocked position. In the unlocked position, the convex portion of the first cam surface (1130a) is facing away from the follower and is not engaging the follower (1400). The drawbar (1200) is in a leftmost position, as illustrated in FIG. 4D, permitting the locking member (1600) to rest in a lowered or disengaged position. In FIG. 4D, the drawbar (1200) can be in contact with the second cam surface (1140) along at least a part of the convex portion. In certain embodiments, the first cam surfaces (1130a, 1130b) and the second cam surface (1140) can be flush along at least one plane.

Figure 5A:
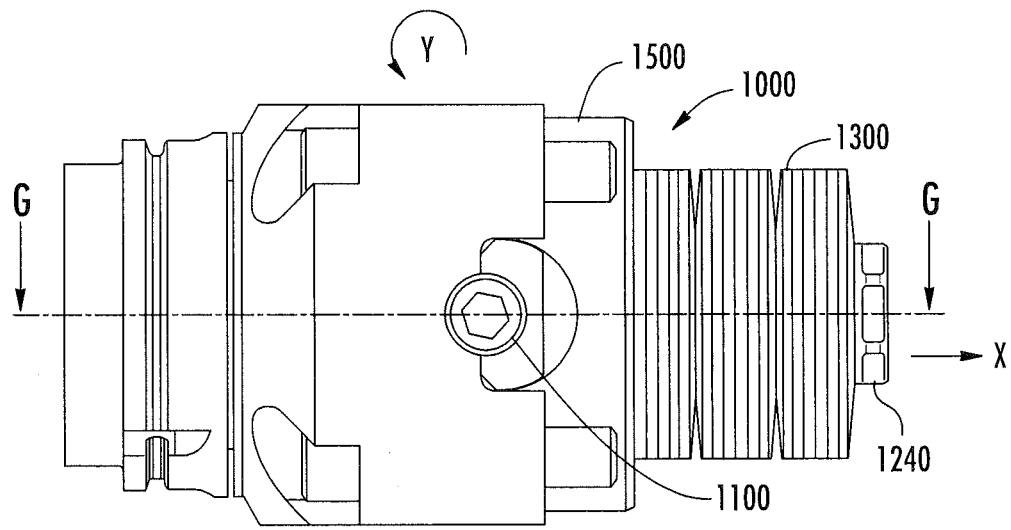
FIG. 5A illustrates an elevational view of a tool coupling system according to one embodiment described herein.
Figure 5B:
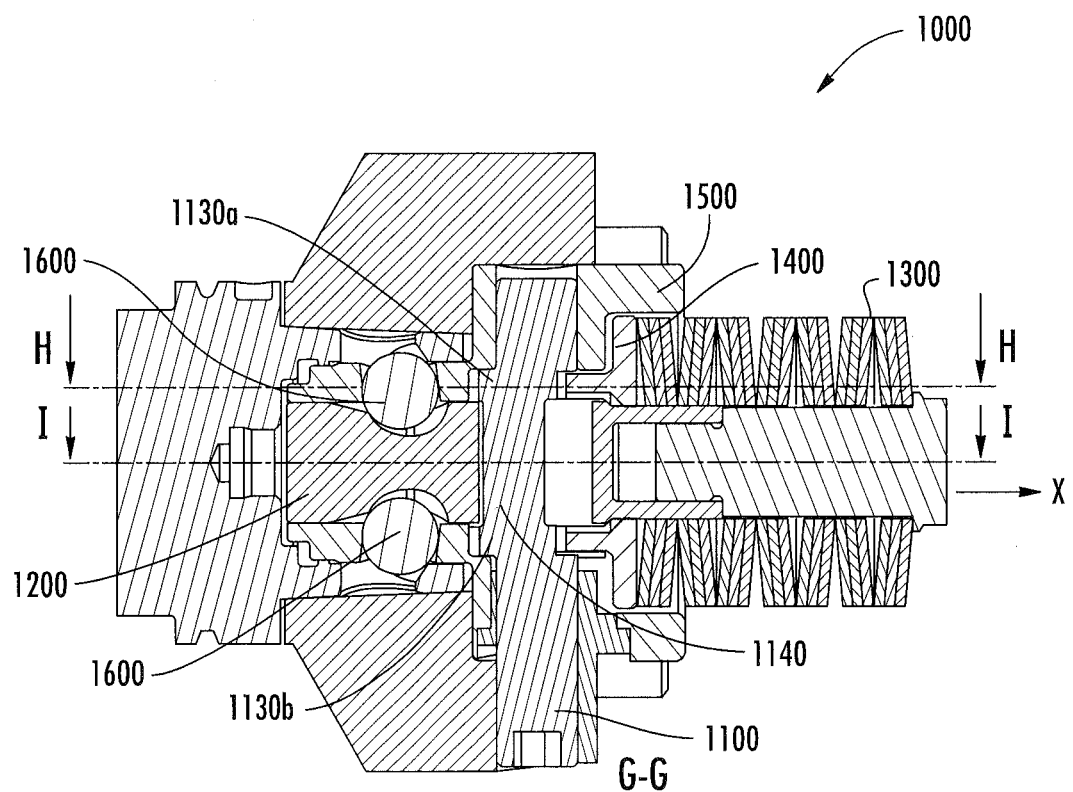
FIG. 5B illustrates a cross-sectional view of the tool coupling system of FIG. 5A taken along line G-G.
Figure 5C:
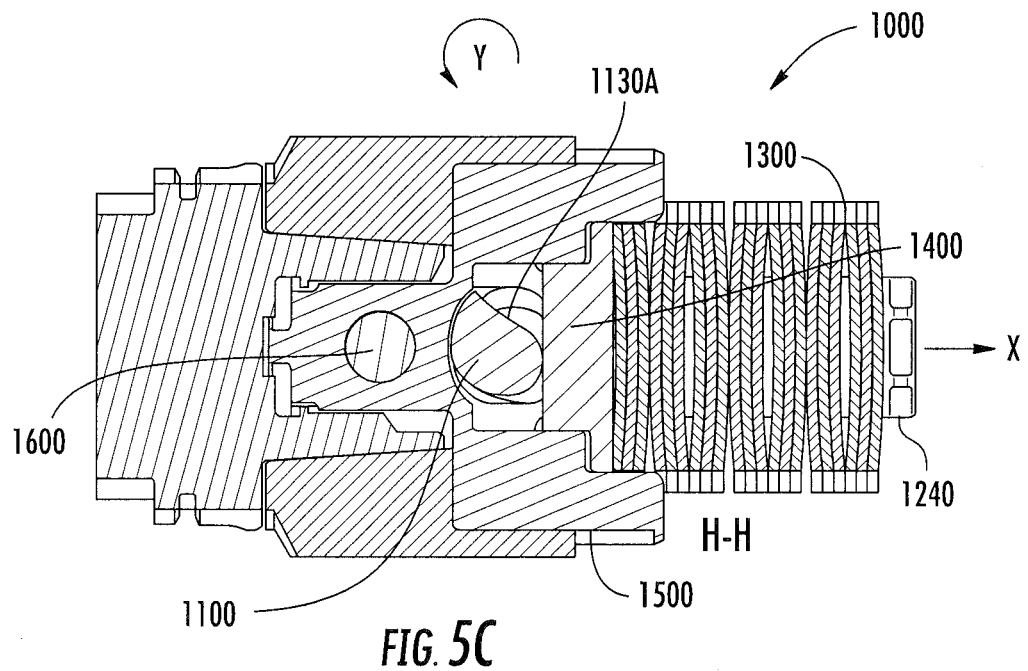
FIG. 5C illustrates a cross-sectional view of the tool coupling system of FIG. 5B taken along line H-H.
Figure 5D:
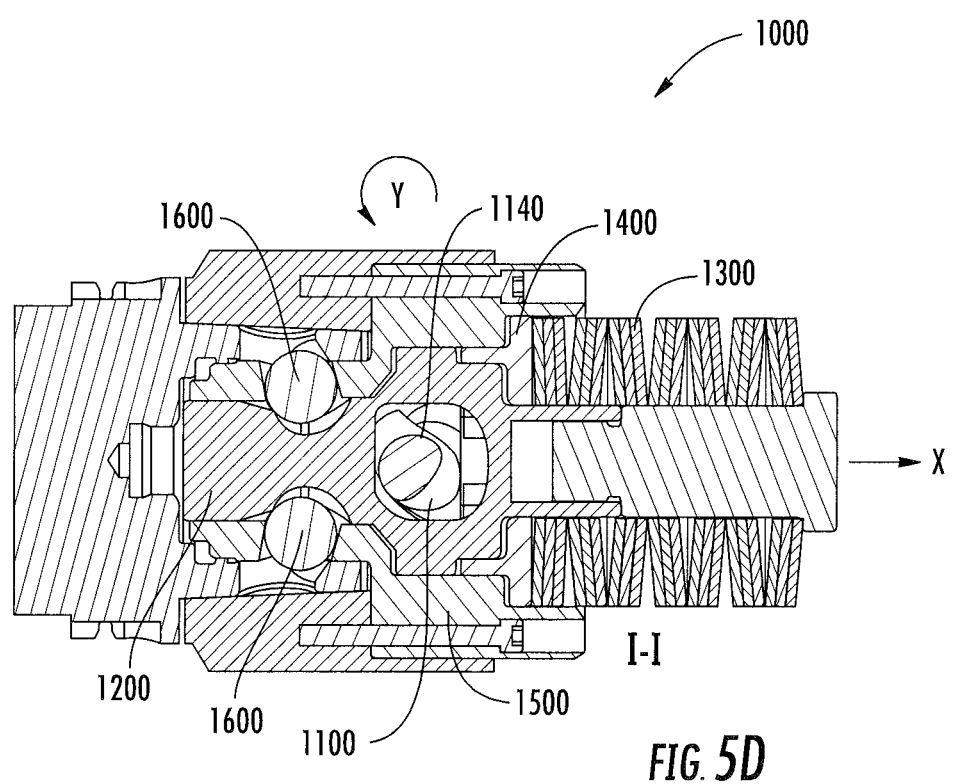
FIG. 5D illustrates a cross-sectional view of the tool coupling system of FIG. 5B taken along line I-I.
Figure 6A:
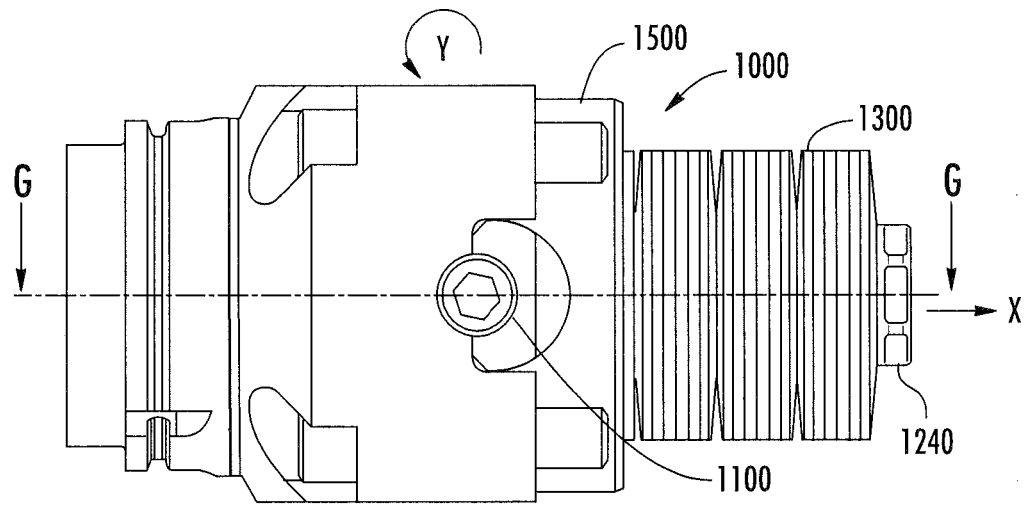
FIG. 6A illustrates an elevational view of a tool coupling system according to one embodiment described herein.
Figure 6B:
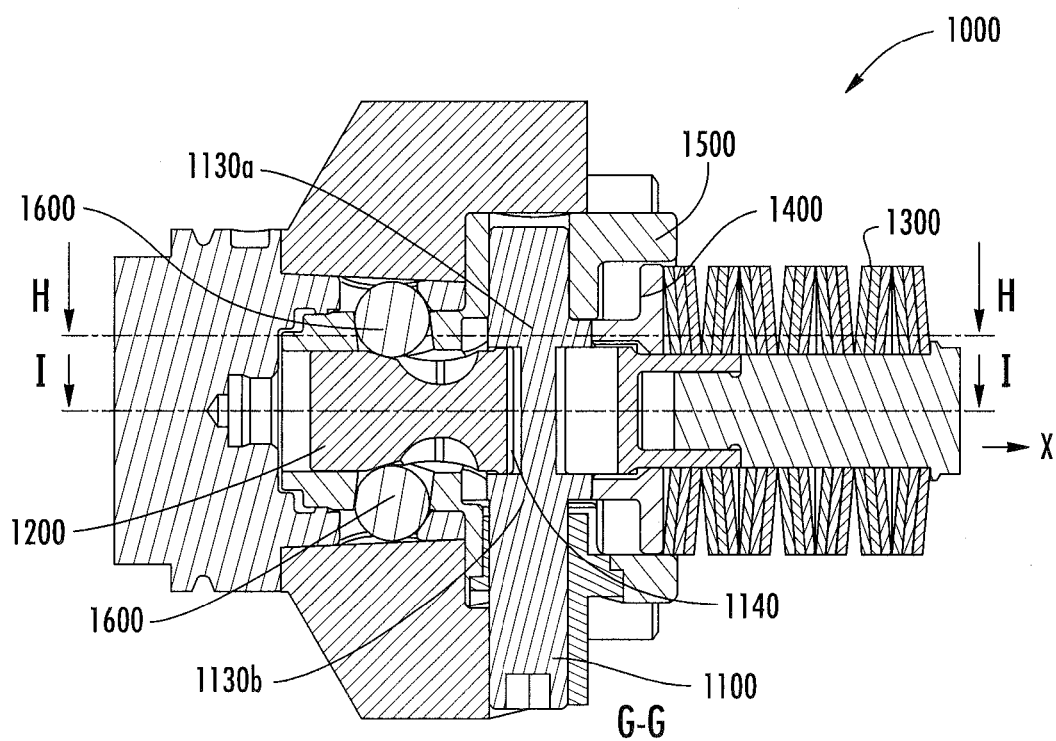
FIG. 6B illustrates a cross-sectional view of the tool coupling system of FIG. 6A taken along line G-G.
Figure 6C:
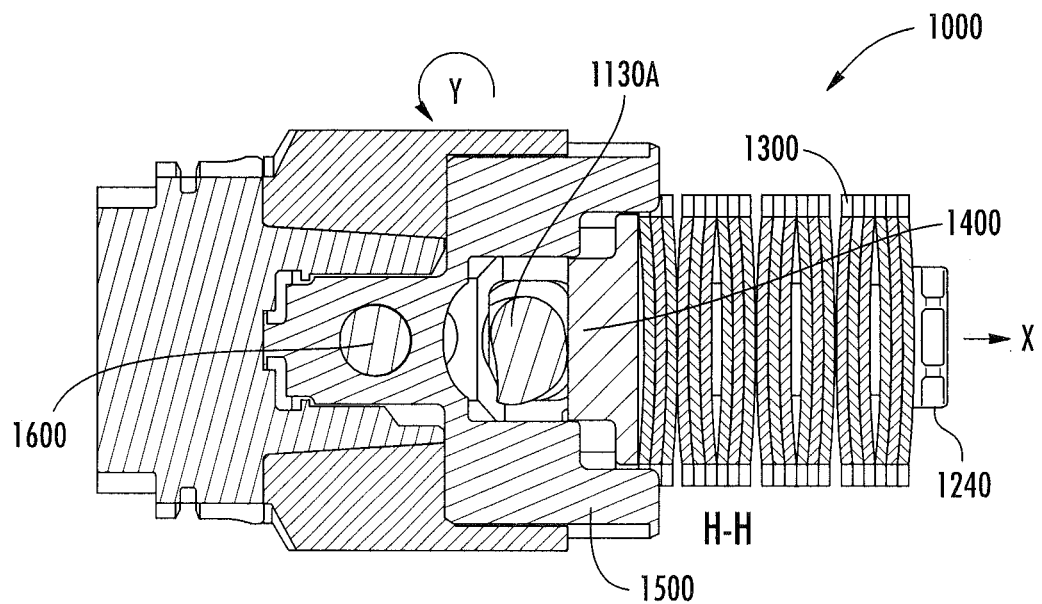
FIG. 6C illustrates a cross-sectional view of the tool coupling system of FIG. 6B taken along line H-H.
Figure 6D:
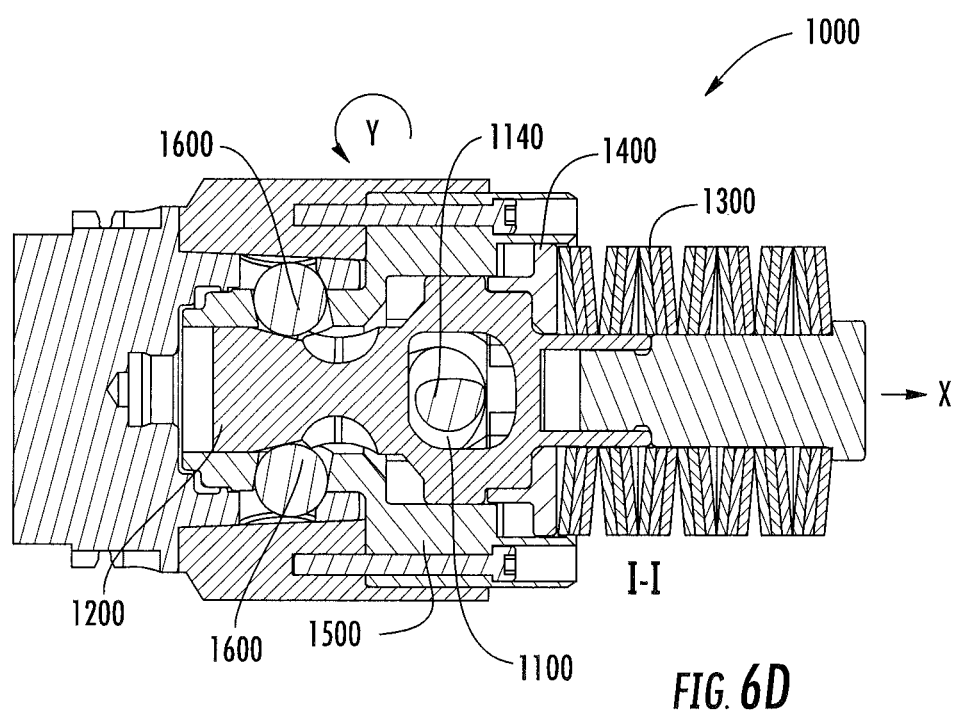
FIG. 6D illustrates a cross-sectional view of the tool coupling system of FIG. 6B taken along line I-I.

FIG. 5C shows a first intermediary position between the unlocked and locked positions wherein the convex portion of the first cam surface (1130a) begins to engage the follower (1400). The movable follower (1400) is displaced in an axial direction substantially parallel to the central longitudinal axis (L-L of FIGS. 3A and 3B), compressing the spring-like element (1300), resulting in force being applied to the end plate (1240) of the drawbar (1200), thereby permitting axial movement of the drawbar (1200) in the same direction. FIG. 5D illustrates the locking elements or members (1600) being displaced, resulting in movement in a radial direction away from the central longitudinal axis.

FIGS. 6A-D illustrate a second intermediary position between the unlocked position and the locked position. Axial displacement of the follower (1400) and the drawbar (1200) results in further movement of the drawbar (1400) and further radial displacement of the locking members (1600). In FIGS. 6A-6D, the locking members (1600) are in a locked position, however the follower (1400) and cam bolt (1100) are not in a locked position.

FIGS. 7A-7D illustrate the locked position. This orientation of the cam bolt (1100) retains the follower (1400), spring-like element (1300) and drawbar (1200) is at the furthest displacement axially from the unlocked position. The locking members (1600) are fully radially displaced, engaging a tool to be coupled or locked into position. As illustrated in FIG. 7D, the second cam surface is not engaged with the drawbar (1200).

As shown by the above-referenced rotation in a first direction, first cam surfaces (1130a, 1130b) provide displacement force against the follower (1400) to enact axial movement of the drawbar (1200) from an unlocked position to a locked position. In such an embodiment, the second cam surface (1140) does not engage or act upon the follower (1400) or the drawbar (1200) to facilitate movement into the locked position. When viewed in the reverse order, beginning at FIG. 7 and ending at FIG. 4, it can be seen that as the first cam surfaces (1130a, 1130b) disengage the follower (1400), the second cam surface (1140) engages the drawbar (1200), supplying necessary force to perform an unlocking step. Having a dual cam permits certain advantages over prior cam bolt architectures. For example, individual cam surfaces can be separately optimized for clamping or unclamping operations.

An embodiment described herein is further illustrated in the following non-limiting example.

Example 1—Comparison of Cam Bolts, Tool Coupling Systems, and Associated Methods A method consistent with the foregoing description in Section III above was carried out and compared to a conventional method utilizing a prior cam bolt architecture. For the following example, a cam bolt consistent with the embodiment illustrated in FIGS. 1A-1D was used, including two first cam surfaces having a first cam profile and one second cam surface having a second cam profile differing from the first cam profile. First and second cam profiles were arranged eccentric to the longitudinal axis of the cam bolt, and both first and second cam profiles were non-circular, having a cross-sectional shape defined by a curved outer surface having a continually increasing radius along at least a portion thereof. First cam surfaces were adjacent to and spaced apart by a second cam surface.

Figure 8:
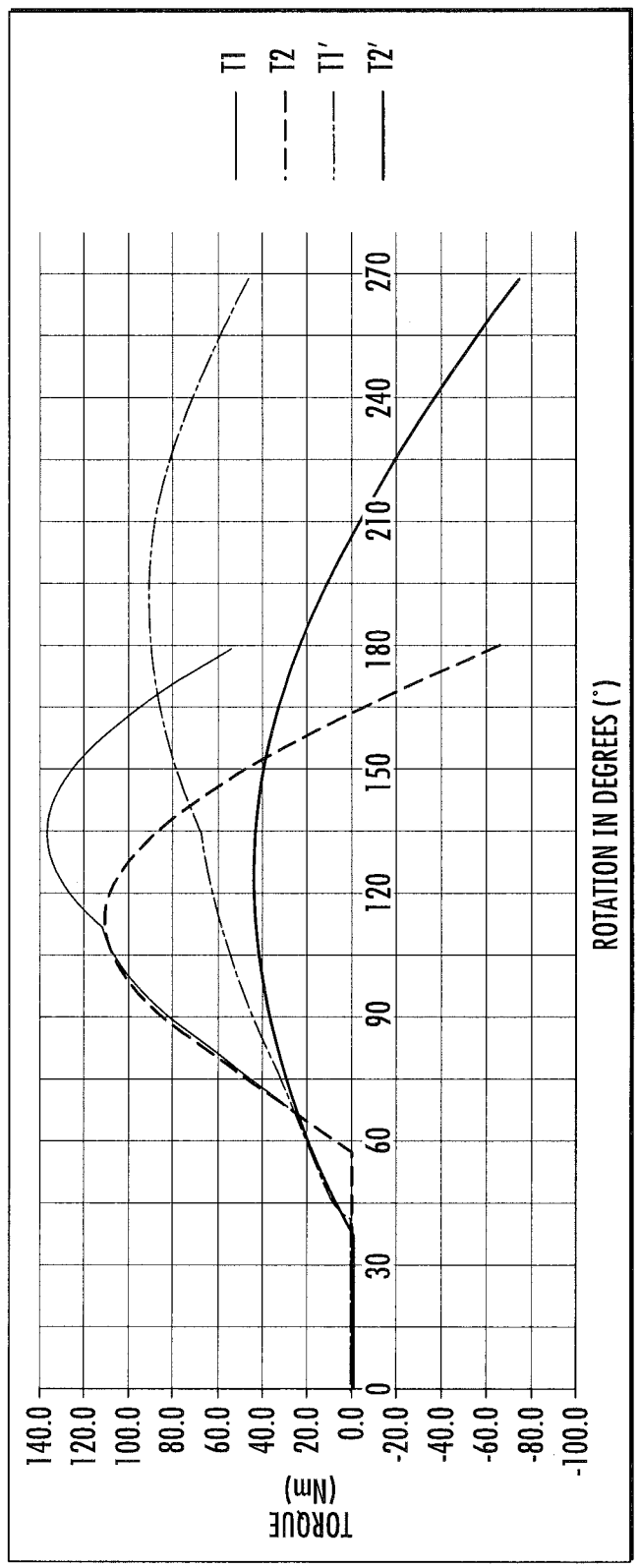
FIG. 8 illustrates data obtained in comparison of a method according to one embodiment described herein and a conventional method.

FIG. 8 illustrates a plot of torque necessary to complete locking and unlocking rotation of a cam bolt consistent with methods described herein as compared to a prior cam bolt architecture. Line T1 depicts torque relative to rotational angle in a locking operation when using a prior cam bolt having design illustrated in FIGS. 2A and 2B. Line T2 shows torque associated with an unlocking rotation for the prior cam bolt. Line T1' depicts torque relative to rotational angle for a locking operation employing a cam bolt described herein (e.g. FIGS. 1A-1D), and Line T2' illustrates torque associated with the unlocking rotation.

As shown in FIG. 8, torque required to enact rotation of the prior cam bolt increases substantially in the range of about 60° to about 140°, reaching a peak of over 135 Nm (T1). Total locking rotation occurred over a span of up to 180°. In comparison, a cam bolt of the present application can provide locking actuation over a rotation of greater than 180°, in this case being a rotation of about 270°, as seen in FIGS. 4-7. As illustrated in FIG. 8, torque required to achieve the locked position gradually increased over the course of the rotation and peaked at a much lower value of approximately 90 Nm.

Figure 9:
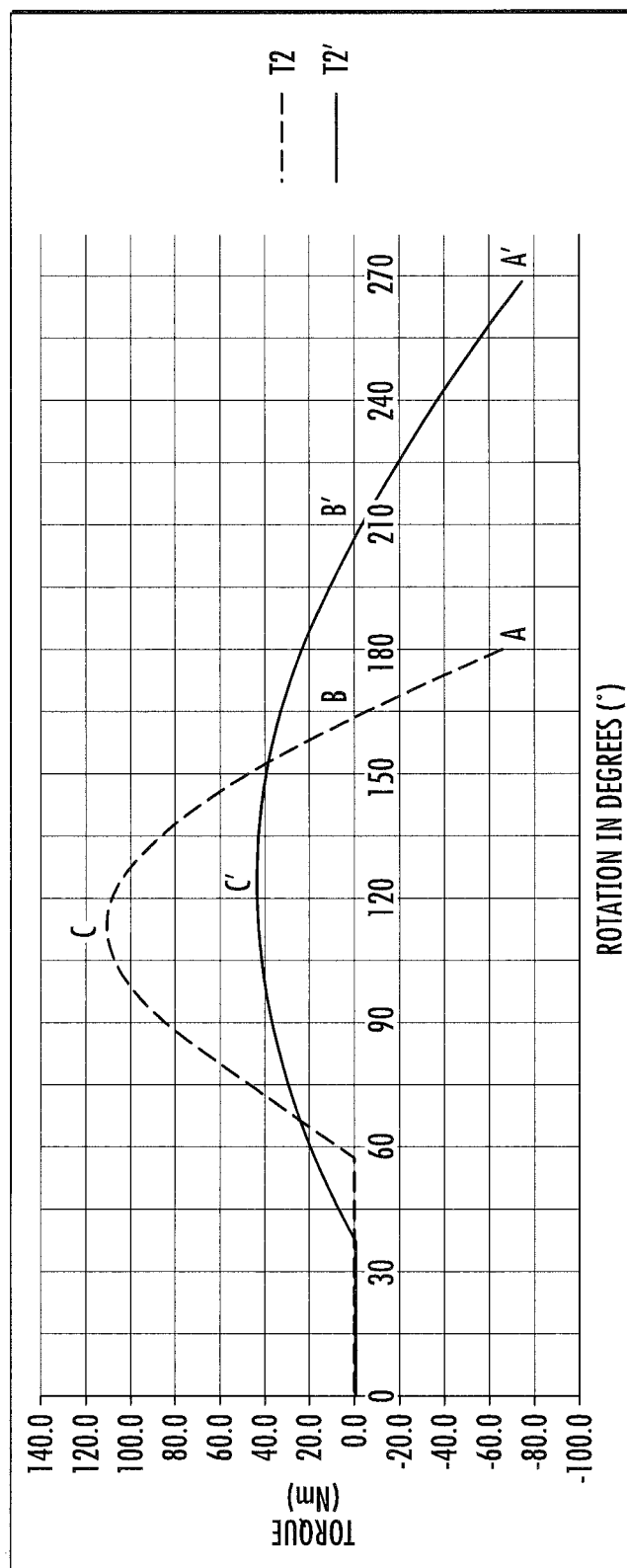
FIG. 9 illustrates data obtained in comparison of a method according to one embodiment described herein and a conventional method during the unclamping action.

FIG. 9 represents data plots of only the unlocking torque necessary in the prior cam bolt architecture as compared to cam bolts consistent with the present disclosure. Beginning at point A on line T2 for the prior cam bolt architecture and rotating towards point B, torque is applied by an operator in an unlocking direction. At point B the torque goes to zero. From point B to point C, the cam shape and position, coupled with the spring-like elements will create a rotation of the cam, results in a pulling action that must be resisted by the operator. As indicated in FIG. 9, the torque pull experienced during an unlocking rotation would be about 110 Nm. Such torque is applied at a relatively high rate of change over a span of about 120° prior to reaching a zero value. In contrast, line T2' illustrates a data plot of torque in an unlocking method consistent with the present disclosure. Beginning at point A' and moving towards B', torque is applied over about 60° by the operator in an unlocking direction. From point B' to point C', torque pulls the operator's hand in the unlocking direction. Line T2' illustrates pulling torque against the operator peaking at about 45 Nm at a much lower rate of change relative to the prior method. Total unlocking torque is applied over a rotation of greater than about 180°.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A tool coupling system defining a central longitudinal axis and comprising:
   a drawbar disposed substantially parallel to the central longitudinal axis and movable between a locked position and an unlocked position;
   at least one spring-like element configured to bias the drawbar into the locked position or the unlocked position;
   at least one follower configured to engage the spring-like element; and
   a cam bolt rotatable about a transverse axis substantially normal to the central longitudinal axis, the cam bolt having at least one first cam surface having a first cam profile and at least one second cam surface having a second cam profile differing from the first cam profile,
   wherein rotating the cam bolt moves the drawbar between the locked position and the unlocked position;
   wherein the first cam profile and the second cam profile are non-circular;
   wherein the first cam surface is configured to engage the follower; and
   wherein the second cam surface is configured to engage the drawbar.

2. The tool coupling system of claim 1, wherein the first cam profile and the second cam profile differ in at least one of size, shape, orientation, location and/or position.

3. The tool coupling system of claim 1, wherein the first cam profile and the second cam profile are eccentric relative to the transverse axis.

4. The tool coupling system of claim 1, wherein the cam bolt has at least two first cam surfaces.

5. The tool coupling system of claim 4, wherein the second cam surface is disposed between the first cam surfaces.

6. The tool coupling system of claim 1, wherein the first cam surface is configured to apply clamping force in a clamping operation, and wherein the second cam surface is configured to apply unclamping force in an unclamping operation.

7. The tool coupling system of claim 1, wherein the follower is configured to adapt and direct force applied to the spring-like element.

8. A tool coupling system defining a central longitudinal axis and comprising:
   a drawbar disposed substantially parallel to the central longitudinal axis and movable between a locked position and an unlocked position;
   at least one spring-like element configured to bias the drawbar into the locked position or the unlocked position;
   a first follower configured to engage the spring-like element and the drawbar;
   a cam bolt rotatable about a transverse axis substantially normal to the central longitudinal axis, the cam bolt having at least one first cam surface having a first cam profile and at least one second cam surface having a second cam profile differing from the first cam profile; and
   a second follower configured to engage the drawbar and the cam bolt;
   wherein rotating the cam bolt moves the drawbar between the locked position and the unlocked position;
   wherein the first cam profile and the second cam profile are non-circular;
   wherein the first cam surface is configured to engage the first follower; and
   wherein the second cam surface is configured to engage the second follower.

* * * * *